(12) United States Patent
Iwata (10) Patent No.: US 7,814,251 B2
(45) Date of Patent: Oct. 12, 2010

(54) DMA TRANSFER CONTROL SYSTEM THAT PERFORMS DATA DECODE AND DATA TRANSFER AND THAT GENERATES A NO OPERATION (NOP) INTERRUPT SIGNAL TO END THE DMA TRANSFER PROCESSING IN RESPONSE TO A NOP DESIGNATION

(75) Inventor: Dan Iwata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 11/951,256

(22) Filed: Dec. 5, 2007

(65) Prior Publication Data
US 2008/0140876 A1 Jun. 12, 2008

(30) Foreign Application Priority Data
Dec. 7, 2006 (JP) ............................. 2006-330075

(51) Int. Cl.
G06F 13/28 (2006.01)
G06F 13/22 (2006.01)
(52) U.S. Cl. ..................... 710/220; 710/22; 710/23; 710/24; 710/25; 710/26; 710/27; 710/28
(58) Field of Classification Search ............. 710/22–28, 710/220
See application file for complete search history.

(56) References Cited

U.S. PATENT DOCUMENTS 5,473,761 A * 12/1995 Parks et al. ..................... 711/4
5,717,952 A * 2/1998 Christiansen et al. ......... 710/22
5,870,535 A 2/1999 Duffin et al.
6,708,234 B2 3/2004 Moteki et al.
6,851,609 B2 * 2/2005 Ando et al. .................. 235/454
6,874,039 B2 * 3/2005 Ganapathy et al. ............ 710/28
6,944,682 B2 * 9/2005 Tanaka ......................... 710/22
2006/0168366 A1 7/2006 Haneda et al.

FOREIGN PATENT DOCUMENTS

| JP | 06-103181 A | 4/1994 |
| JP | 07-021117 A | 1/1995 |
| KR | 10-1998-0086978 A | 12/1998 |
| KR | 10-2006-0087363 A | 8/2006 |

* cited by examiner

Primary Examiner—Chun-Kuan Lee
(74) Attorney, Agent, or Firm—Canon U.S.A., Inc. I.P. Division (57) ABSTRACT

A direct memory access (DMA) transfer apparatus configured to sequentially read, into a register, at least one transfer setting value for data transfer stored in a memory and to perform DMA transfer processing based on the read transfer setting value includes a unit configured to receive a No Operation (NOP) designation for designating no performance of DMA transfer as the transfer setting value, and a unit configured to generate, if the NOP designation has been performed with the transfer setting value read into the register, an NOP interrupt signal to end transfer processing without performing the DMA transfer.

3 Claims, 11 Drawing Sheets

FIG. 4 offset

| | | |
|---|---|---|
| +0x00 | Next Descriptor Address | 400 |
| +0x04 | Source Address 0 | 401 |
| +0x08 | Source Address 1 | 402 |
| +0x0c | Destination Address | 403 |
| +0x10 | Length 0 | 404 |
| +0x14 | Length 1 | 405 |
| +0x18 | Length 2 | 406 |
| +0x1c | Operation | 407 |
| +0x20 | Descriptor Control | 408 |

```
PackbitsR1**********
**********G1*********
B1*****************See
dRowR2 ********  ········
         ··························
         ···························
         ····························
```
— 511

DMA TRANSFER CONTROL SYSTEM THAT PERFORMS DATA DECODE AND DATA TRANSFER AND THAT GENERATES A NO OPERATION (NOP) INTERRUPT SIGNAL TO END THE DMA TRANSFER PROCESSING IN RESPONSE TO A NOP DESIGNATION

BACKGROUND OF THE INVENTION

1. Field of the Invention

The present invention relates to a direct memory access (DMA) transfer apparatus configured to sequentially read, into a register, at least one transfer setting value for data transfer stored in a memory and to perform DMA transfer processing based on the read transfer setting value, a data transfer control method using the DMA transfer apparatus, and a data transfer control program using the DMA transfer apparatus.

2. Description of the Related Art

A conventional method uses data transfer hardware, such as a DMA controller, during processing for converting input data described based on a specific data format into another data format.

Such data transfer hardware is used when decoded data obtained based on received coded or encrypted data is used for specific processing, such as print processing or display processing.

In particular, a conventional printing apparatus prints out decoded image data obtained based on received coded and compressed image data. In the case of using an inkjet type printer (hereinafter simply referred to as a "printer") that performs processing on print data including line-sequential raster data, a host computer sequentially sends data coded and compressed for each line.

Conventional data transfer hardware, particularly, conventional DMA transfer hardware, sequentially loads, on a register, transfer setting values (hereinafter referred to as a "descriptor") for a plurality of transfer operations, which are appropriately stored in a memory to perform data transfer, as discussed in Japanese Patent Application Laid-Open No. 07-21117. Such a DMA transfer mode is called an "array chain transfer mode" or a "link array chain transfer mode".

In many cases, print data from a host computer may have different data length line by line after decoding processing. In particular, in the case of Run Length Encoding (RLE), such as PackBits Encoding or Seed Row Encoding, the data length after decoding may be known only after performing decoding processing.

In conventional processes, one way to unify the length of the lines is to set a width of a paper sheet (sheet of a document to be read) as the decoded data buffer length. In this regard, however, it is more useful not to access the memory with regard to the portion of the sheet having no images during image processing. Furthermore, it increases the number of accesses to the memory to fixedly set the data length for the width of the sheet as the decoded data buffer length, which is not useful in terms of processing efficiency.

In this regard, another conventional method predicts a necessary minimum decoded data buffer length and sets a descriptor for one band to perform decoding. If the predicted necessary minimum decoded data buffer length is different from an actual decoded data length, particularly, if the actual decoded data length is longer than the decoded data buffer length, the decoded data is segmented or cut at the length equivalent to the decoded data buffer length. In this case, the CPU re-generates an appropriate descriptor with an elongated decoded data buffer length, and the decoder performs decoding again.

In this regard, Japanese Patent Application Laid-Open No. 06-103181 discusses a method in which, when a failure, such as a transmission failure, has occurred, a sending unit notifies an abort notification signal to the DMA controller. In this method, the DMA controller, after receiving the notification, automatically resumes data transfer.

Meanwhile, a few restrictions exist for a DMA controller or a decoder to reduce the number of gates in the electronic circuits and the cost of manufacturing thereof. For example, a minimum value that can be set as the transfer byte length is restricted.

In the case where it is necessary to process data smaller than the minimum value, the CPU performs the necessary processing. For example, in the case where it is necessary for the CPU to decode Seed Row-coded N-th line data, the CPU can decode the N-th line data only after (N−1)-th line data has been completely decoded.

In this case, the CPU once executes a descriptor including the setting for the decoding processing for up to the (N−1)-th line data, decodes the N-th line data, and provides the (N+1)-th line and subsequent data with a new descriptor.

However, in the case of performing the decoding processing again as described above, it is necessary to generate the settings for the data to be coded with the CPU and to manage the generated settings on the memory, although the setting for the hardware can be stored in the memory as a descriptor. That is, it is necessary, in this case, to generate separate setting data and to manage the generated setting data with respect to the decoding processing to be performed with the DMA controller or the decoder and to the decoding processing to be performed with the CPU.

Furthermore, if the data decoded with the CPU can be processed with the hardware, it is necessary to generate a new descriptor. As described above, in a conventional method, it is necessary for the CPU to perform complicated processing, due to the restriction as to the minimum value that can be set on the DMA controller or the decoder as the transfer byte length.

SUMMARY OF THE INVENTION

The present invention is directed to a control program that enables previously setting descriptors (transfer setting values) at once, even when a DMA transfer apparatus (DMA controller) cannot perform DMA transfer. Furthermore, the present invention is directed to a method for reducing a load taken for reprocessing, the method using shared descriptors (setting values for data transfer stored in a memory) in software processing (data transfer with a CPU) and hardware processing (DMA transfer). Moreover, the present invention is directed to a method for, in the case of decoding using a DMA transfer apparatus, efficiently performing decoding processing by the DMA transfer apparatus and decoding processing by a CPU in an appropriate collaboration with each other using a previously generated descriptor with a control program.

According to an aspect of the present invention, a direct memory access (DMA) transfer apparatus configured to sequentially read, into a register, at least one transfer setting value for data transfer stored in a memory and to perform DMA transfer processing based on the read transfer setting value includes a unit configured to receive a No Operation (NOP) designation for designating no performance of DMA transfer as the transfer setting value, and a unit configured to generate, if the NOP designation has been performed with the transfer setting value read into the register, an NOP interrupt signal to end transfer processing without performing the DMA transfer.

According to another aspect of the present invention, a data transfer control method for performing data transfer with a central processing unit (CPU) using a direct memory access (DMA) transfer apparatus configured to sequentially read, into a register, at least one transfer setting value for data transfer stored in a memory and to perform DMA transfer processing based on the read transfer setting value, the DMA transfer apparatus including a unit configured to receive a No Operation (NOP) designation for designating no performance of DMA transfer as the transfer setting value, and a unit configured to, if the NOP designation has been performed with the transfer setting value read into the register, generate an NOP interrupt signal to end transfer processing without performing the DMA transfer, includes performing transfer equivalent to a transfer function of the DMA transfer apparatus with processing by the CPU, detecting the NOP interrupt signal, and if the NOP interrupt signal has been detected, performing data transfer with processing by the CPU based on the transfer setting value read into the register in the DMA transfer apparatus and, after that, restarting the DMA transfer to the DMA transfer apparatus. For example, computer-executable instructions may be stored on a medium readable by an apparatus that includes the CPU; when the instructions are executed by the apparatus, it causes the apparatus to perform the data transfer control method.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and the numerical values set forth in these embodiments are not intended to limit the scope of the present invention unless it is specifically stated otherwise.

As used herein, decode and decoding may also refer to decompressing of compressed data. Thus, coded and compressed data may be decoded in accordance with the present invention to yield decoded and decompressed data that corresponds to the coded and compressed data. Data in a device may alternatively be described as being on the device, for example, data stored in a register or data stored on a register, without change in meaning. While description is made with respect to an inkjet printer, other device types may alternatively be used in accordance with the present invention.

First Exemplary Embodiment

Figure 1:
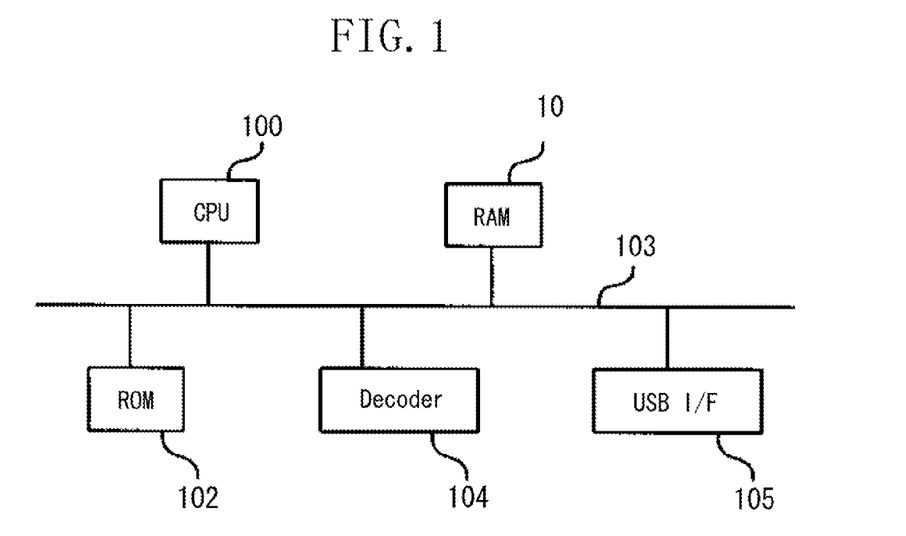
FIG. 1 illustrates an example of a hardware configuration of a printer according to an exemplary embodiment of the present invention.

Now, a first exemplary embodiment of the present invention will be described below. FIG. 1 illustrates an example of a hardware configuration of the inkjet printer (hereinafter simply referred to as a "printer") according to an exemplary embodiment of the present invention.

Referring to FIG. 1, a central processing unit (CPU) 100 includes a microprocessor element.

A read-only memory (ROM) 102 is a non-volatile memory storing a control program for the CPU 100. A random access memory (RAM) 101 is a volatile memory. When the printer is powered on and activated, the control program on the ROM 102 is loaded on the RAM 101, and then the CPU 100 controls the printer based on the control program loaded on the RAM 101. A universal serial bus (USB) interface (I/F) 105 is an I/F between the printer and a host computer (not illustrated) mutually connected with a cable.

A decoder 104 is a decoding circuit having a function for decoding coded and compressed data and DMA-transferring the decoded data.

The CPU 100, the RAM 101, the ROM 102, the decoder 104, and the USB I/F 105 are in communication with one another via a system bus 103.

Figure 2:
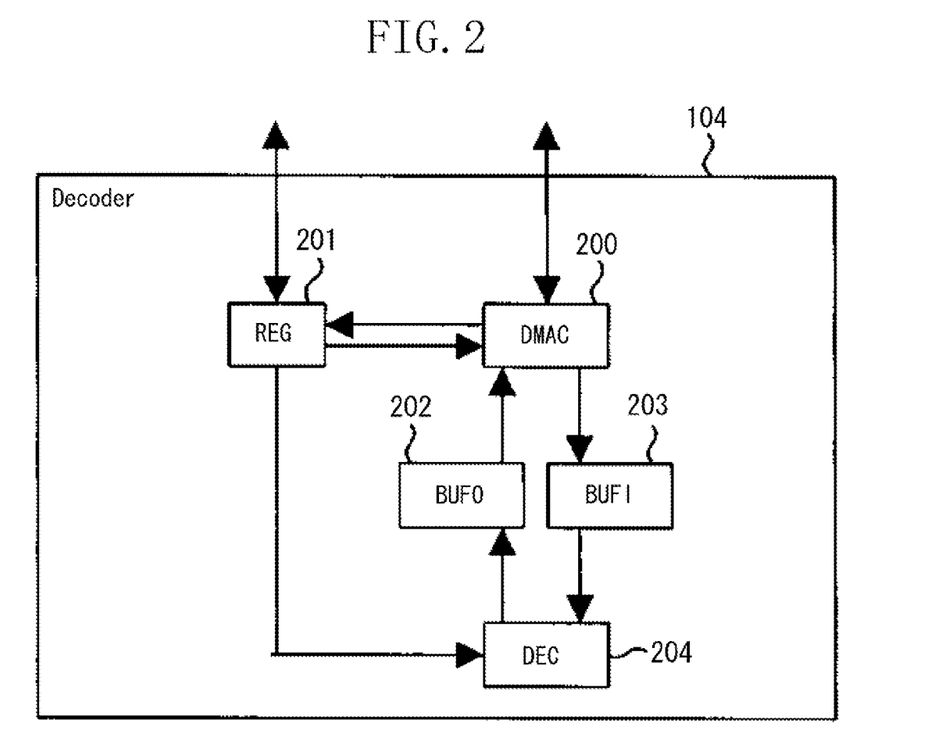
FIG. 2 illustrates an example of an internal configuration of a decoder in FIG. 1 according to an exemplary embodiment of the present invention.

FIG. 2 illustrates an example of function blocks of the decoder 104 according to the present exemplary embodiment.

Referring to FIG. 2, a DMA controller (DMAC) 200 can DMA-transfer data both in a single transfer mode and a link array chain transfer mode.

A register block (REG) 201 can perform an operation setting for the decoder 104.

A decoding processing block (DEC) 204 decodes Pack-Bits-coded and compressed data or Seed Row-coded and compressed data. The DEC 204 performs the decoding processing based on a content of the setting on the REG 201.

The decoder 104 further includes a receiving buffer (BUFI) 203 and a sending buffer (BUFO) 202.

The DMAC 200 transfers data on the RAM 101 to the BUFI 203 via the system bus 103 according to the setting on the REG 201. The DEC 204 stores the decoded data in the BUFO 202. Then, the DMAC 200 transfers the data in the BUFO 202 to the RAM 101 via the system bus 103 according to the setting on the REG 201.

Figure 3:
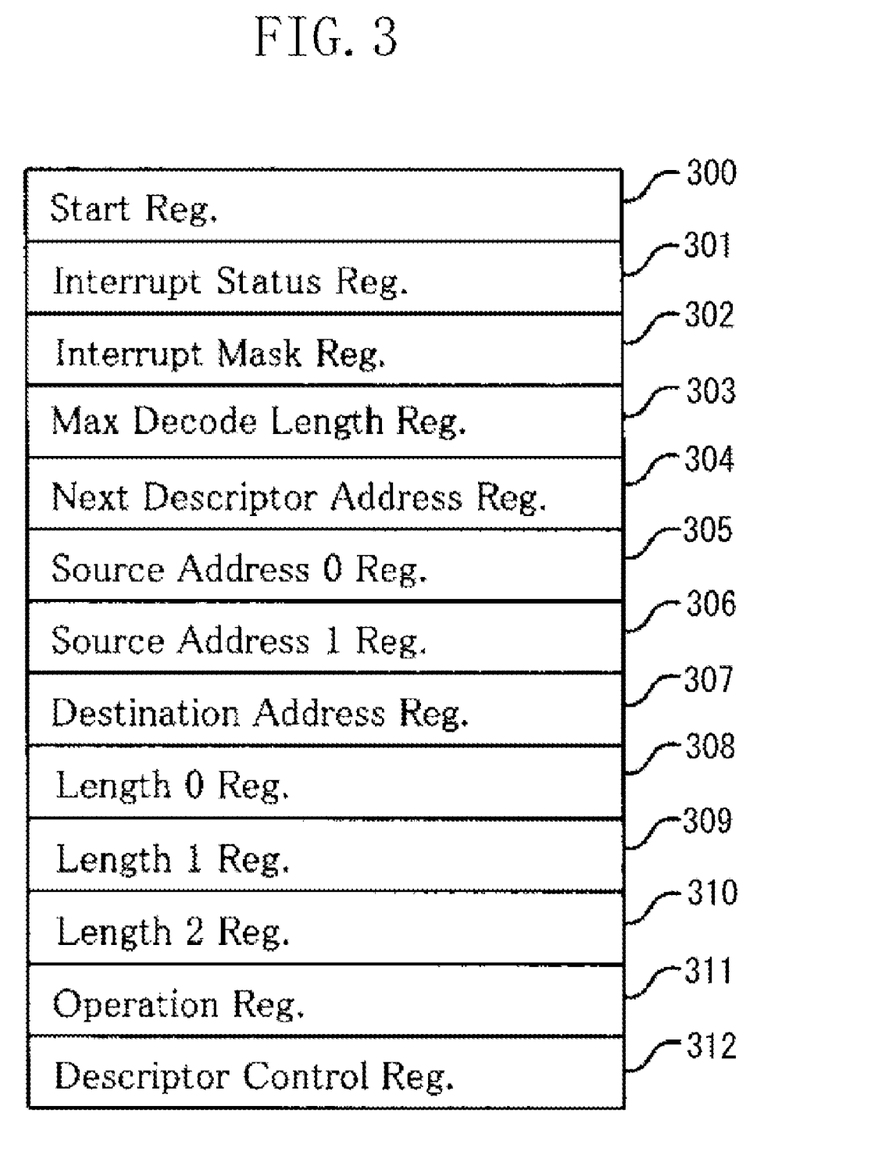
FIG. 3 illustrates an example of a configuration of an internal register of a register block (REG) in FIG. 2 according to an exemplary embodiment of the present invention.

The REG 201 includes registers illustrated in FIG. 3. Each register includes 32-bit data. Referring to FIG. 3, Start Reg. 300 is a register (in FIG. 3, a register is abbreviated as "Reg.") for starting DMA transfer in response to writing of a value by the CPU 100. The single transfer mode or the link array chain transfer mode can be selected as the DMA transfer mode based on the written value.

Interrupt Status Reg. 301 is a register that describes an interrupt whose request has been issued by the DMAC 200. The CPU 100 can read the value from the Interrupt Status Reg. 301 to recognize the status of interrupt on the decoder 104, and can cancel the interrupt by writing a value on the Interrupt Status Reg. 301. In the present exemplary embodiment, bits 31 through 29 are used. The bit 31 is allocated for a DMA transfer end interrupt, the bit 30 is allocated for a no operation (NOP) end interrupt, and the bit 29 is allocated for a decoded data buffer length over-interrupt.

The DMA transfer end interrupt includes a DMA transfer end interrupt in the single transfer mode and a DMA transfer end interrupt for all chains in the link array chain transfer mode. The NOP end interrupt is issued before the start of DMA transfer NOP-designated by a Descriptor Control Reg. 312. The decoded data buffer length over-interrupt is issued when the decoded data length exceeds the predetermined decoded data buffer length.

An Interrupt Mask Reg. 302 is used together with the Interrupt Status Reg. 301. With the Interrupt Status Reg. 301 and the Interrupt Mask Reg. 302, the CPU 100 can separately and individually mask each of the above interrupts.

A Max Decode Length Reg. 303 describes and stores a maximum value of the values for the data length of the data decoded by the DEC 204. When the CPU 100 writes the values into the Start Reg. 300 and thus the DMA transfer starts, the values are cleared.

A Next Descriptor Address Reg. 304 is a register for setting a starting address of a descriptor to be read next during the link array chain transfer mode. During the link array chain transfer mode, the descriptors are arranged on the memory in a distributed manner while being linked based on the content thereof. Every time DMA transfer ends, a next descriptor to be pointed based on the register content is read. The CPU 100 writes values in the Next Descriptor Address Reg. 304 before starting link array chain transfer. The CPU 100 writes the values stored in the descriptor read by the DMAC 200 during the link array chain transfer mode.

A Source Address 0 Reg. 305 is a register for setting an address of a transfer source (a starting address of the coded and compressed data). A Source Address 1 Reg. 306 is a register for setting an address of a transfer source (a starting address of Seed Row-coded data decoded by Seed Row decoding (not used in PackBits decoding)).

A Destination Address Reg. 307 is a register for setting an address of a transfer destination. The range of DMA transfer and the transfer destination can be designated with the Source Address 0 Reg. 305, the Source Address 1 Reg. 306, and the Destination Address Reg. 307.

A Length 0 Reg. 308 is a register for setting a length of the coded and compressed data to be decoded. In the case of PackBits decoding, 4 bytes or greater values can be set for the Length 0 Reg. 308. In the case of Seed Row decoding, 0 byte or 4 bytes or greater can be set for the Length 0 Reg. 308. A Length 1 Reg. 309 is a register for designating the length of the Seed Row-coded data in the case of Seed Row decoding.

A Length 2 Reg. 310 is a register for designating a decoded data buffer length. If, as a result of decoding processing, the decoded data length exceeds the value set in the Length 2 Reg. 310, then the decoding processing is suspended and a value "1" is set to the bit 29 of the Interrupt Status Reg. 301.

If an interrupt has not been masked by the Interrupt Mask Reg. 302, the DMAC 200 issues a decoded data buffer length over-interrupt and ends the DMA transfer. On the other hand, if an interrupt has been masked by the Interrupt Mask Reg. 302 and if the DMAC 200 is in the link array chain transfer mode, the DMAC 200 continues the processing for a next chain. Furthermore, if, as a result of decoding, the decoded data length value is smaller than the value set in the Length 2 Reg. 310, then the DMAC 200 cancels the short portion.

An Operation Reg. 311 is a register for designating a method of decoding. The CPU 100 can designate a decoding method (either the PackBits decoding or the Seed Row decoding) according to the value that the CPU 100 writes on the Operation Reg. 311.

A Descriptor Control Reg. 312 is a register for designating control of descriptors. According to the design of the CPU 100, the CPU 100 cannot write a setting value into the Descriptor Control Reg. 312. The content of the Descriptor Control Reg. 312 is set based on the descriptor read during the link array chain transfer. When a value "1" is set for the bit 31, which describes that the current transfer is a last transfer, the DMAC 200 ends the link array chain transfer after performing the DMA-transfer according to the setting in the read descriptor.

When the value for the bit 31 of the Interrupt Status Reg. 301 is changed to the value "1" and if an interrupt has not been masked by the Interrupt Mask Reg. 302, the DMAC 200 generates a DMA transfer end interrupt.

When a value "1" is set for the bit 30 of the Interrupt Status Reg. 301, which describes that the current transfer is NOP-designated transfer, the DMAC 200 ends the link array chain transfer without performing DMA transfer according to the setting in the read descriptor. Then, the value set for the bit 30 of the Interrupt Status Reg. 301 is changed to the value "1", and if an interrupt has not been masked by the Interrupt Mask Reg. 302, then the DMAC 200 generates an NOP end interrupt.

Figure 4:
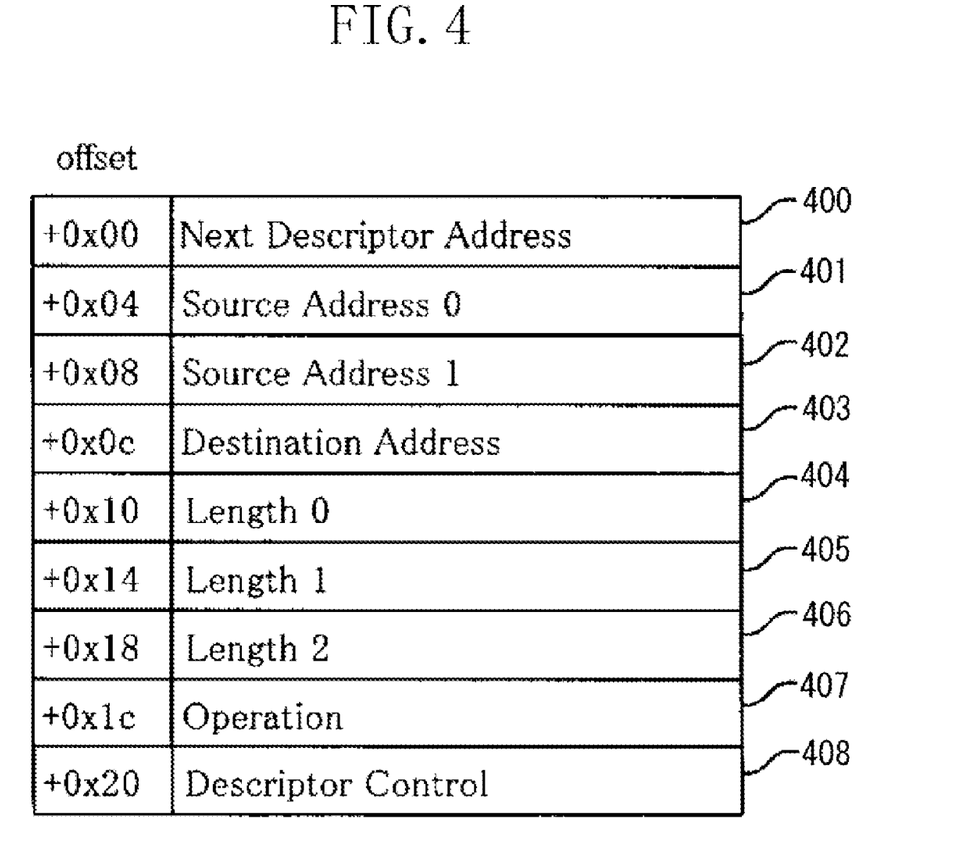
FIG. 4 illustrates an example of a configuration of a descriptor read by the decoder in FIG. 1 according to an exemplary embodiment of the present invention.

FIG. 4 illustrates an example of a configuration of the descriptor used in link array chain transfer according to an exemplary embodiment. Referring to FIG. 4, a Next Descriptor Address 400 is a setting value corresponding to the Next Descriptor Address Reg. 304. A Source Address 0 401 is a setting value corresponding to the Source Address 0 Reg. 305. A Source Address 1 402 is a setting value corresponding to the Source Address 1 Reg. 306. A Destination Address 403 is a setting value corresponding to the Destination Address Reg. 307.

A Length 0 404 is a setting value corresponding to the Length 0 Reg. 308. A Length 1 405 is a setting value corresponding to the Length 1 Reg. 309. A Length 2 406 is a setting value corresponding to the Length 2 Reg. 310. An Operation 407 is a setting value corresponding to the Operation Reg. 311. A Descriptor Control 408 is a setting value corresponding to the Descriptor Control Reg. 312.

When the CPU 100 issues an instruction for link array chain transfer by the Start Reg. 300, the DMAC 200 reads a descriptor having an address described in the Next Descriptor Address Reg. 304 and then writes the value in the read descriptor on a corresponding register. Then, the DMA transfer is performed according to the set register value.

Here, the bit 30 of the Descriptor Control 408 implements an NOP designation unit. Furthermore, a CPU data transfer unit exists on the RAM 101 as a control program. The CPU 100 can read and execute the control program on the RAM 101. An interrupt detection unit is implemented as an interrupt vector set on the CPU 100.

The configuration of the present exemplary embodiment will be described with reference to FIGS. 5A through 5C.

Figure 5A:
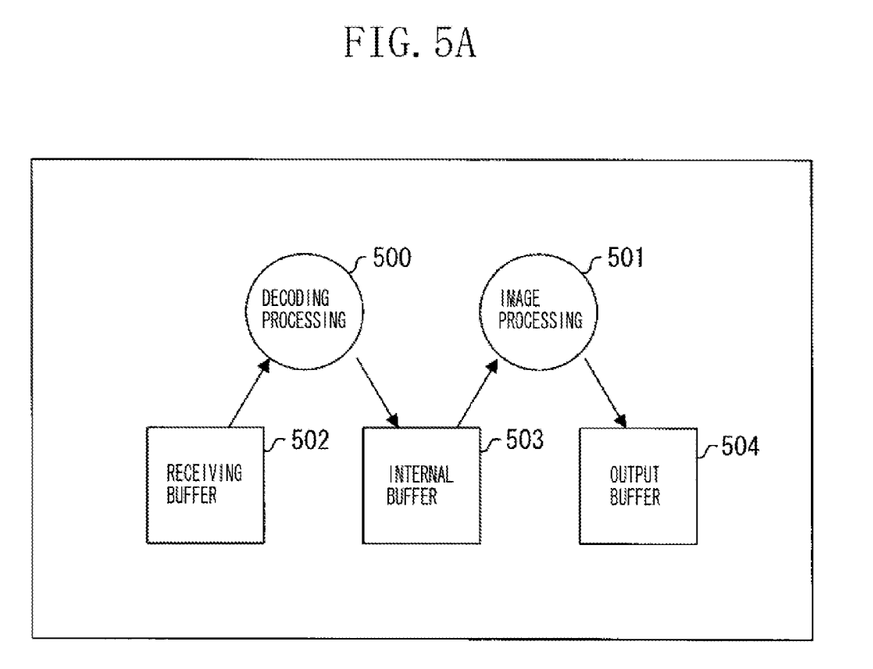
FIG. 5A illustrates an example of a software configuration of a printer.

FIG. 5A briefly illustrates an example of a software configuration of a printer that may be used with the present exemplary embodiment, although it is noted that other software configurations may alternatively be used. Referring to FIG. 5A, in decoding processing 500, the software of the printer sequentially decodes coded and compressed data stored in a receiving buffer 502 and arranges the decoded data on an internal buffer 503 with a unit of several lines (also referred to as a "band"). In image processing 501, the software performs specific image processing on the data stored in the internal buffer 503, and then stores the image-processed data in an output buffer 504. The data on the output buffer 504 is converted into a drive signal for a recording head, and thus the software on the CPU 100 prints an image of the data.

Figure 5B:
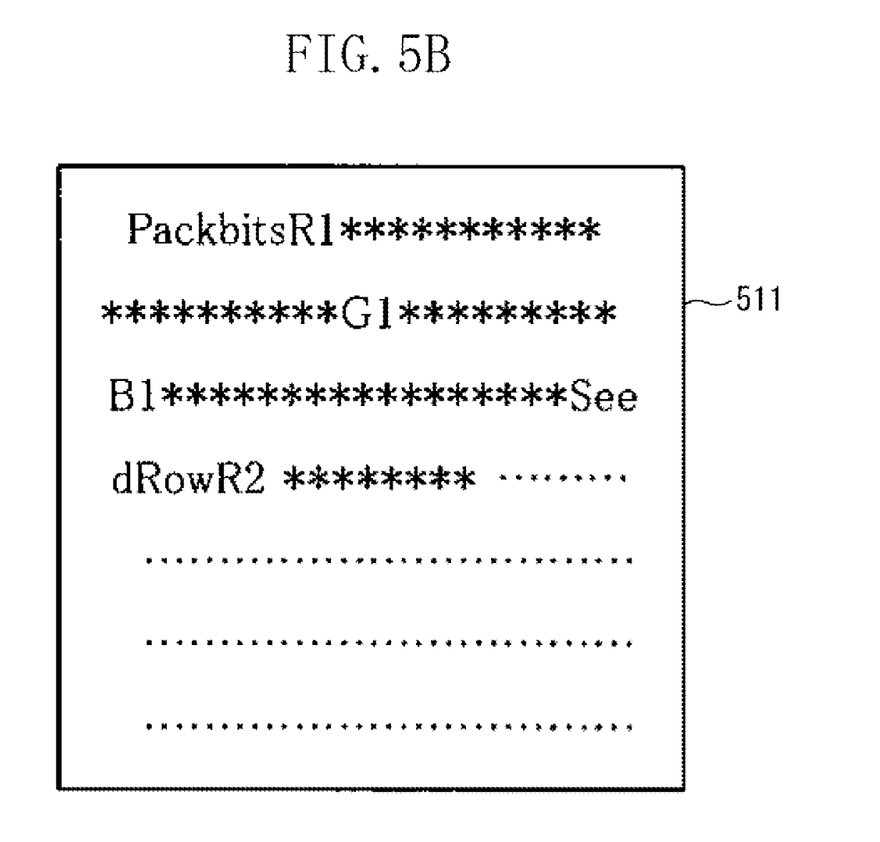
FIG. 5B illustrates an example of a configuration of coded data processed with a printer.

FIG. 5B illustrates an example of coded and compressed data 511 stored in the receiving buffer 502. The coded and compressed data includes a print control command that describes a type of the coded and compressed data. The data is line-sequentially arranged, e.g., as the first line for red (R), the first line for green (G), and the first line for blue (B) The type of the coded and compressed data includes PackBits-coded data and Seed Row-coded data. FIG. 5C illustrates an example of decoded data stored in the internal buffer 503. The data is stored in the internal buffer 503 in units of a band 521, 522, 523 for each color R, G, B respectively.

Now, an operation of the present exemplary embodiment will be described below.

Figure 6:
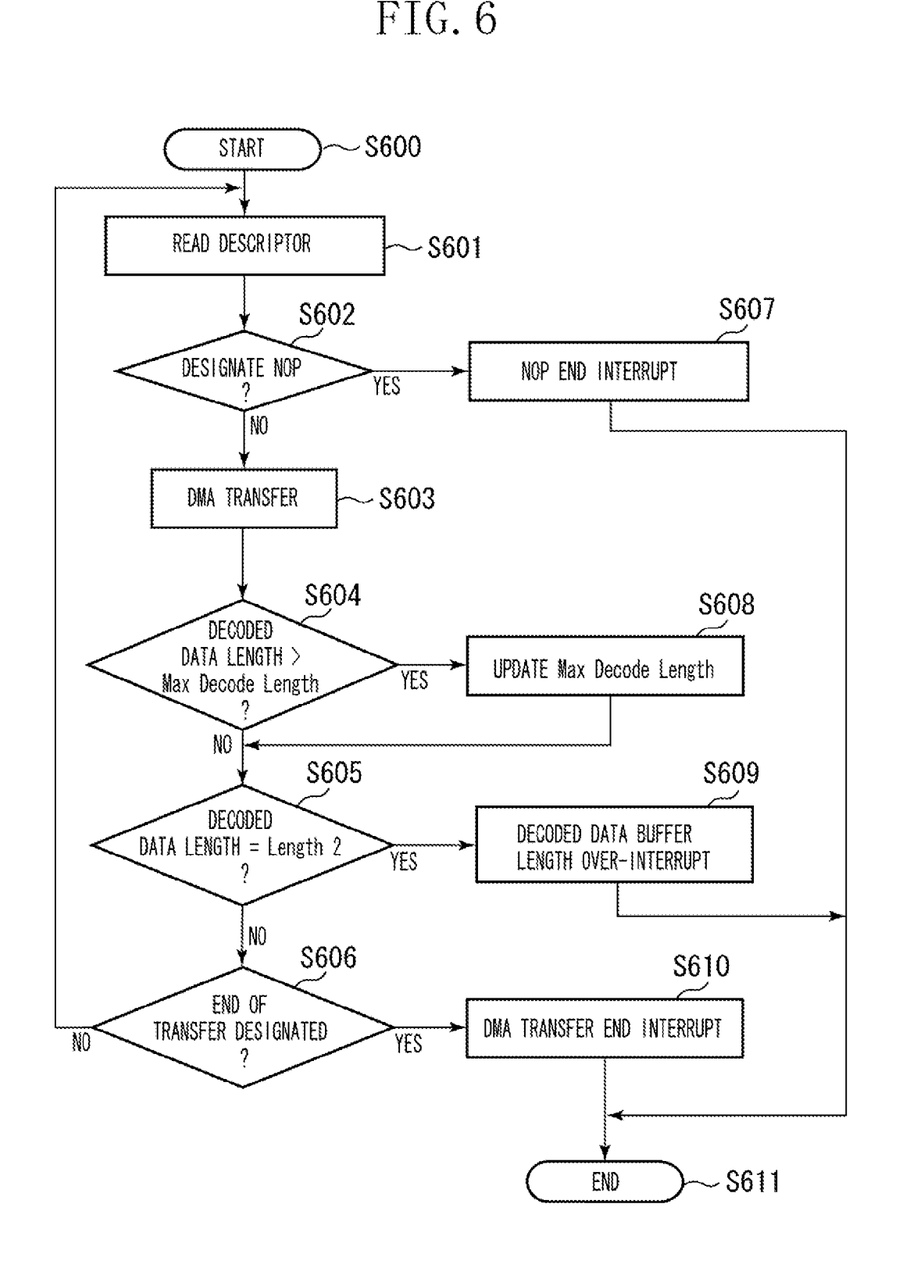
FIG. 6 is a flow chart illustrating an example of processing for link array chain transfer according to an exemplary embodiment of the present invention.

FIG. 6 is a flow chart illustrating an example of a link array chain transfer operation by the decoder 104 including the DMAC 200 according to an exemplary embodiment of the present invention. The present exemplary embodiment designates an NOP with a descriptor, then generates an NOP end interrupt, and thus can start the decoding processing by the CPU 100.

Referring to FIG. 6, in step S600, the CPU 100 instructs starting link array chain transfer with the Start Reg. 300.

In step S601, the DMAC 200 reads one descriptor based on the address stored in the RAM 101, which is described in the Next Descriptor Address Reg. 304, and then transfers the read descriptor to the REG 201. The REG 201 writes setting values in the descriptor into the respective associated registers in FIG. 3.

In step S602, the DMAC 200 reads the value in the Descriptor Control Reg. 312 and determines whether the value "1" is set for the bit 30 of the Descriptor Control Reg. 312. If it is determined in step S602 that the value "1" is set for the bit 30 of the Descriptor Control Reg. 312, i.e., to designate NOP (YES in step S602), then the processing advances to step S607. In step S607, the DMAC 200 ends the link array chain transfer and writes the value "1" (NOP end interrupt) into the bit 30 of the Interrupt Status Reg. 301. If the value "0" is set for the bit 30 of the Interrupt Mask Reg. 302, the DMAC 200 issues an interrupt signal to the CPU 100, and then the processing advances to step S611. In step S611, the processing ends.

On the other hand, if it is determined in step S602 that the value "0" is set for the bit 30 of the Descriptor Control Reg. 312 (NO in step S602), then the processing advances to step S603. In step S603, the DMAC 200 performs data transfer in cooperation with the DEC 204, the BUFI 203, and the BUFO 202. Here, the DMAC 200 counts the length of the data that has been internally decoded, and if the counted data length reaches the decoded data buffer length designated by the Length 2 Reg. 310, the DMAC 200 suspends the data transfer even when the data transfer is currently in progress. The processing then advances to step S604.

In step S604, the DMAC 200 compares the data length of the decoded data counted in step S603 and the value on the Max Decode Length Reg. 303 to determine whether the data length of the decoded data is longer than that set on the Max Decode Length Reg. 303. If it is determined in step S604 that the data length of the decoded data is longer than that on the Max Decode Length Reg. 303 (YES in step S604), then the processing advances to step S608. In step S608, the DMAC 200 writes the length of the decoded data in the Max Decode Length Reg. 303 and then processing advances to step S605. On the other hand, if it is determined in step S604 that the data length of the decoded data is equal to or shorter than that on the Max Decode Length Reg. 303 (NO in step S604), then the processing advances to step S605 without advancing through step S608.

In step S605, the DMAC 200 compares the length of the decoded data counted in step S603 and the value in the Length 2 Reg. 310 to determine whether the decoded data length is equal to the value in the Length 2 Reg. 310.

If it is determined in step S605 that the decoded data length is at least equal to the value in the Length 2 Reg. 310 (YES in step S605), then the DMAC 200 determines that the decoded data length exceeds the decoded data buffer length, and the processing advances to step S609. In step S609, the DMAC 200 ends the link array chain transfer and writes the value "1" (decoded data buffer length over-interrupt) into the bit 29 of the Interrupt Status Reg. 301. If the value "0" has been set for the bit 29 of the Interrupt Mask Reg. 302 here, then the DMAC 200 issues an interrupt signal to the CPU 100. Then, the processing advances to step S611 to end the processing. However, if it is determined in step S605 that the decoded data length is less than the value in the Length 2 Reg. 310 (NO in step S605), then the processing advances to step S606.

In step S606, the DMAC 200 determines whether the value "1" has been set for the bit 31 of the Descriptor Control Reg. 312 read in step S602. If the value "1" has been set for the bit 31 of the Descriptor Control Reg. 312 read in step S602 (YES in step S606), then the DMAC 200 determines that the link array chain transfer has been completed and the processing advances to step S610. In step S610, the DMAC 200 ends the link array chain transfer and writes the value "1" (DMA transfer end interrupt) into the bit 31 of the Interrupt Status Reg. 301. If the value "0" has been set for the bit 31 of the Interrupt Mask Reg. 302, then the DMAC 200 issues an interrupt signal to the CPU 100. Then the processing advances to step S611 to end the processing.

On the other hand, if it is determined in step S606 that the value "0" has been set for the bit 31 of the Descriptor Control Reg. 312 (NO in step S606), then the processing returns to step S601 to continue the processing.

Now, a data transfer control method performed during processing for decoding the data stored in the receiving buffer 502 (FIG. 5A) and storing the decoded data in the internal buffer 503, according to an exemplary embodiment, will be described below. The CPU 100 performs the decoding processing 500 while handling 64 lines as one segment (hereinafter simply referred to as a "band").

Figure 7:
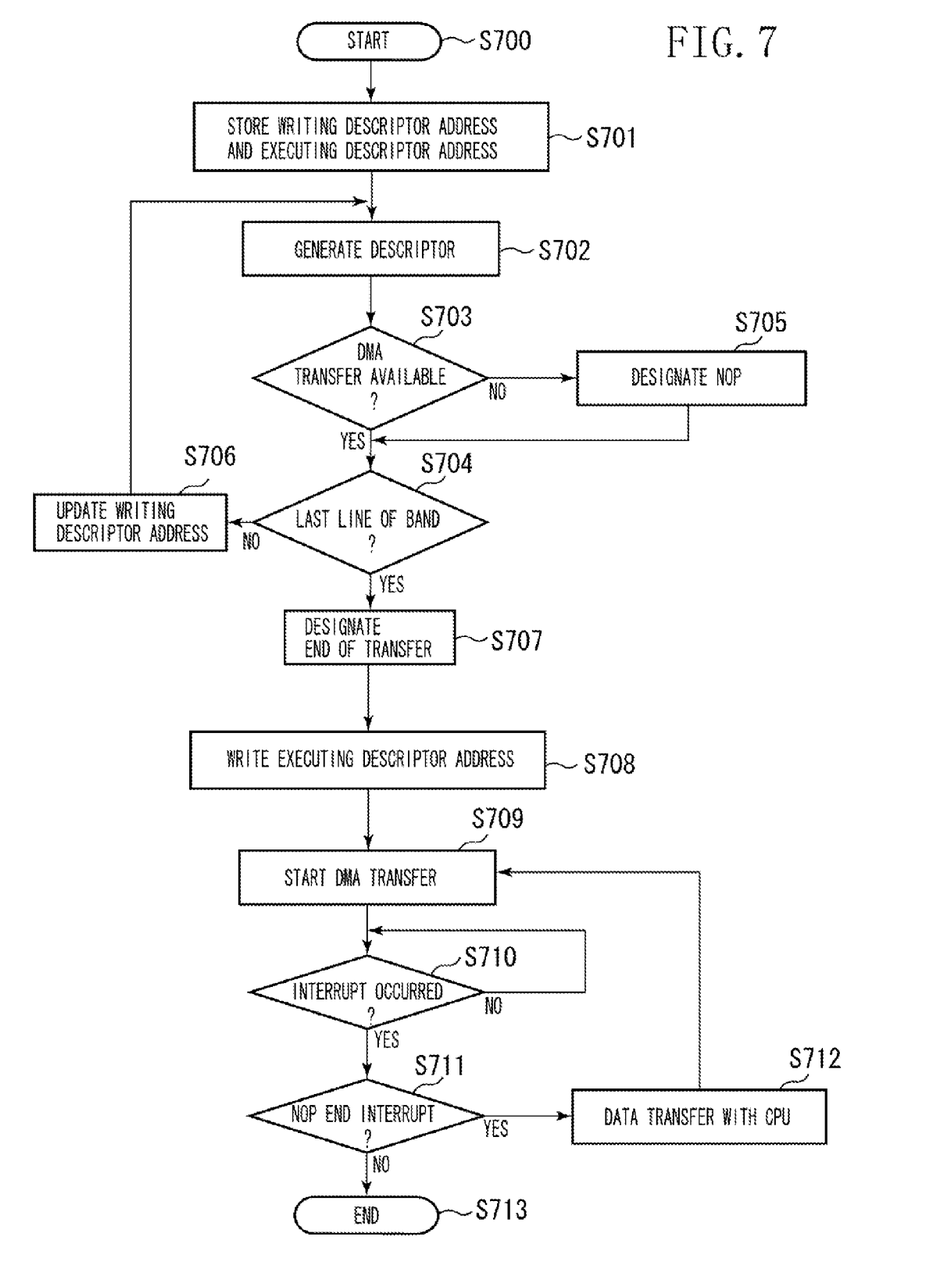
FIG. 7 is a flow chart illustrating an example of data transfer processing (without reprocessing) for one band according to an exemplary embodiment of the present invention.

FIG. 7 is a flow chart illustrating an example of control processing in which the CPU 100 controls the decoder 104 including the DMAC 200, decodes image data stored in the receiving buffer 502, and transfers the decoded data to the internal buffer 503.

In an exemplary embodiment, descriptors that can be set for one band are provided at appropriate positions on the memory space. Furthermore, the Next Descriptor Address 400 of each descriptor is previously set with a value so that the descriptors can be referred to from the first descriptor. Thus, the DMAC 200 can recognize an address of a descriptor to be read next, by simply reading a specific descriptor.

Furthermore, since the length of the decoded data required for printing is equivalent to a maximum width of a printable area of a print sheet, the Length 2 406 of each descriptor is set with a number of bytes equivalent to a maximum printable width (sheet width) as the decoded data buffer length. If the decoded data length is equal to or longer than the setting value in the Length 2 406 as a result of the decoding processing, the decoder 104 issues a notification of excessive decoded data buffer length. Here, however, it is not necessary to perform the decoding processing again by changing the setting value for the Length 2 406. Thus, the DMAC 200 masks neither the DMA transfer end interrupt nor NOP end interrupt but masks only the decoded data buffer length over-interrupt with the Interrupt Mask Reg. 302.

Referring to FIG. 7, in step S700, the CPU 100 starts the processing for a band.

In step S701, the CPU 100 stores the address of the first descriptor as the writing descriptor address and executing descriptor address.

In step S702, a descriptor is generated. More particularly, the CPU 100 starts the processing for one line. The CPU 100 further interprets the print control command and recognizes the data length and the decoding method with respect to the line. Moreover, the CPU 100 sets the setting for transferring the decoded data to the internal buffer 503 in the descriptor existing at the writing descriptor address.

In step S703, the CPU 100 determines whether the DMA transfer can be performed. Here, the CPU 100 determines that the DMA transfer cannot be performed if the data length is equal to or shorter than 4 bytes in the case of the PackBits encoding. Furthermore, the CPU 100 determines that the DMA transfer cannot be performed if the data length is 2, 3, or 4 bytes in the case of the Seed Row encoding. However, these values for the byte length can be changed according to the predetermined minimum value that can be set as the transfer byte length for the DMAC 200 and the decoder 104. This can be applied to other embodiments of the present invention described below.

If it is determined in step S703 that the DMA transfer cannot be performed (NO in step S703), then the processing advances to step S705. In step S705, the CPU 100 sets the value "1" to the bit 30 of the Descriptor Control 408 to designate NOP, and processing advances to step S704. On the other hand, if it is determined in step S703 that the DMA transfer can be performed, the CPU 100 sets the value "0" to the bit 30 of the Descriptor Control 408 and does not designate NOP, and processing advances to step S704.

In step S704, the CPU 100 determines whether the currently processed line is the last line of the current band. If it is determined in step S704 that the currently processed line is the last line of the current band (YES in step S704), then the processing advances to step S707. In step S707, the CPU 100 sets the value "1" to the bit 31 of the Descriptor Control 408 and designates ending the link array chain transfer, and processing advances to step S708.

On the other hand, if it is determined in step S704 that the currently processed line is not the last line of the current band (NO in step S704), then the processing advances to step S706. In step S706, the CPU 100 stores the value of the Next Descriptor Address 400 in the writing descriptor address, and sets the value "0" to the bit 31 of the Descriptor Control 408. The processing returns to step S702.

In step S708, the CPU 100 writes the executing descriptor address into the Next Descriptor Address Reg. 304. In step S709, the CPU 100 instructs starting the link array chain transfer with the Start Reg. 300.

In step S710, the CPU 100 waits until an interrupt by the decoder 104 occurs. During this time, the CPU 100 can perform other necessary processing in parallel (with another process or thread).

When an interrupt by the decoder 104 occurs (YES in step S710), then in step S711, the CPU 100 reads the value from the Interrupt Status Reg. 301 and determines the factor of the interrupt. If the interrupt factor is the DMA transfer end interrupt (NO in step S711), the CPU 100 clears the value in the Interrupt Status Reg. 301 and then the processing advances to step S713. In step S713, the data decoding processing ends.

On the other hand, if the interrupt factor is the NOP end interrupt (YES in step S711), then the processing advances to step S712. In step S712, the CPU 100 reads the value in each register of the REG 201, (thereby obtaining the setting in REG 201), decodes the data with the processing by the CPU 100 according to the setting, and then stores the decoded data in the internal buffer 503. Then, the CPU 100 clears the value in the Interrupt Status Reg. 301, and the processing returns to step S709.

Here, the REG 201 includes the value set at the time the NOP end interrupt has occurred. Thus, the DMAC 200 resumes the DMA transfer from the next line by reading a descriptor based on the address in the Next Descriptor Address Reg. 304.

Figure 5C:
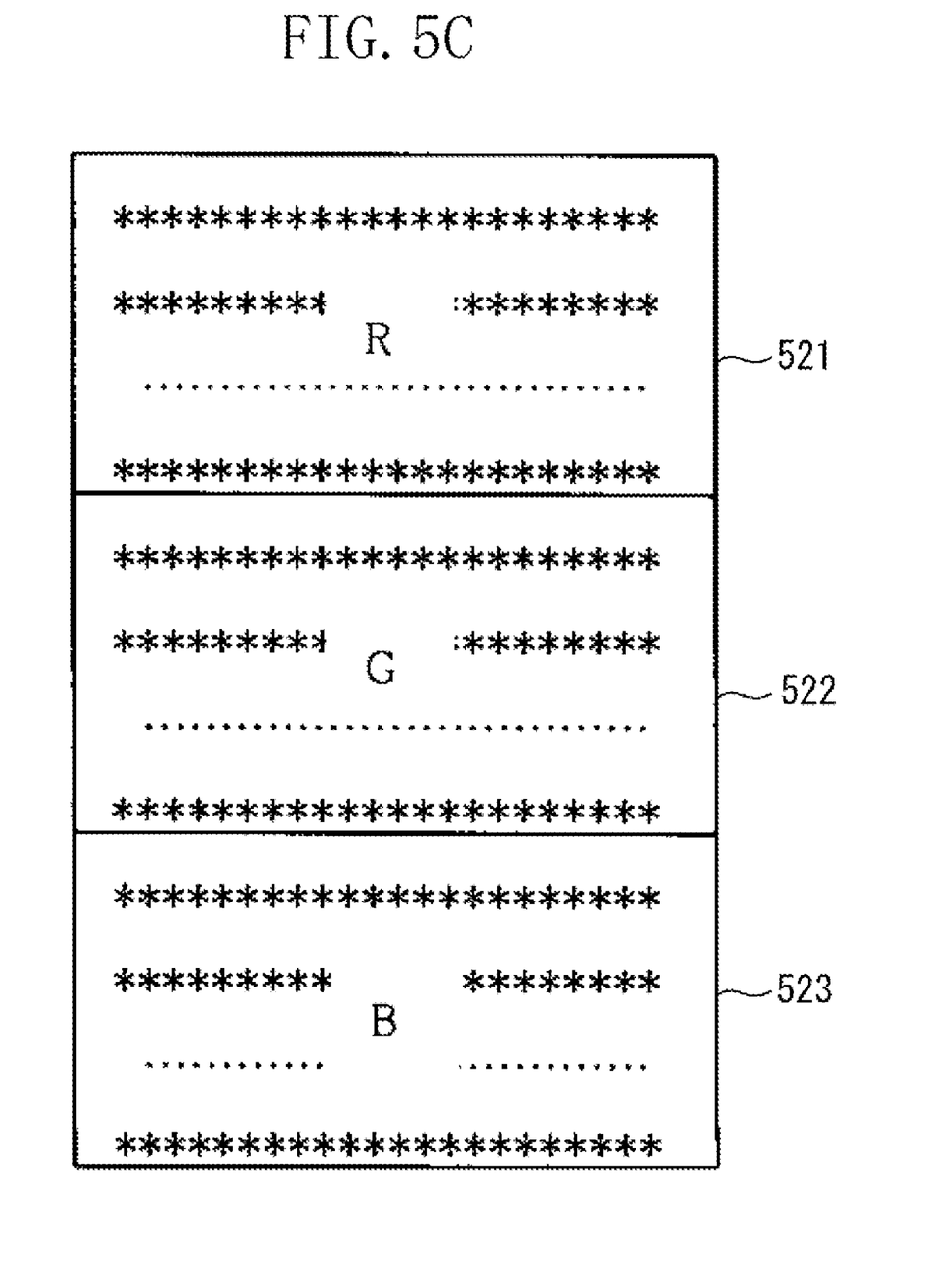
FIG. 5C illustrates an example of a configuration of data decoded with a printer.

In the case of data including three colors of R, G, B, such as the one illustrated in FIG. 5B or FIG. 5C, the DMAC 200 repeats steps S702 through S704 the number of times that can be expressed as "the number of lines×the number of colors (three)", in such a manner and order as "R: first line, G: first line, B: first line, R: second line, G: second line, B: second line, . . . ."

With the above-described hardware configuration and the control method, the present exemplary embodiment can easily generate a control program without segmenting the descriptor during the processing for one band, by performing data transfer in units of a band. That is, with the present exemplary embodiment described above, it is not required, with respect to the decoding processing to be performed with the DMA controller or the decoder or the decoding processing to be performed with the CPU, to separately generate or manage setting data. Furthermore, according to the present exemplary embodiment, the decoding processing to be performed with the DMA controller or the decoder and the decoding processing to be performed with the CPU can be smoothly performed in cooperation with each other via the NOP interrupt.

Second Exemplary Embodiment

A second exemplary embodiment of the present invention will be described whose DMA transfer control uses a printer having a hardware configuration the same as or alternatively similar to that in FIG. 1.

In the example illustrated in FIG. 7, the number of bytes equivalent to the maximum printable length (sheet width) is set to the Length 2 406 for each line, so that there is no need to perform the decoding processing again. However, if an original document has an image only in a part thereof, the coded and compressed data may exist only in the corresponding part. Accordingly, even if the number of bytes equivalent to the maximum printable width is designated in the Length 2 406 (decoded data buffer length), the actual decoded data length is short. Thus, the decoder 104 may need to access the RAM 101 an extra number of times to complete processing up to the length of the Length 2 406. The present exemplary embodiment is intended to address this matter.

Figure 8A:
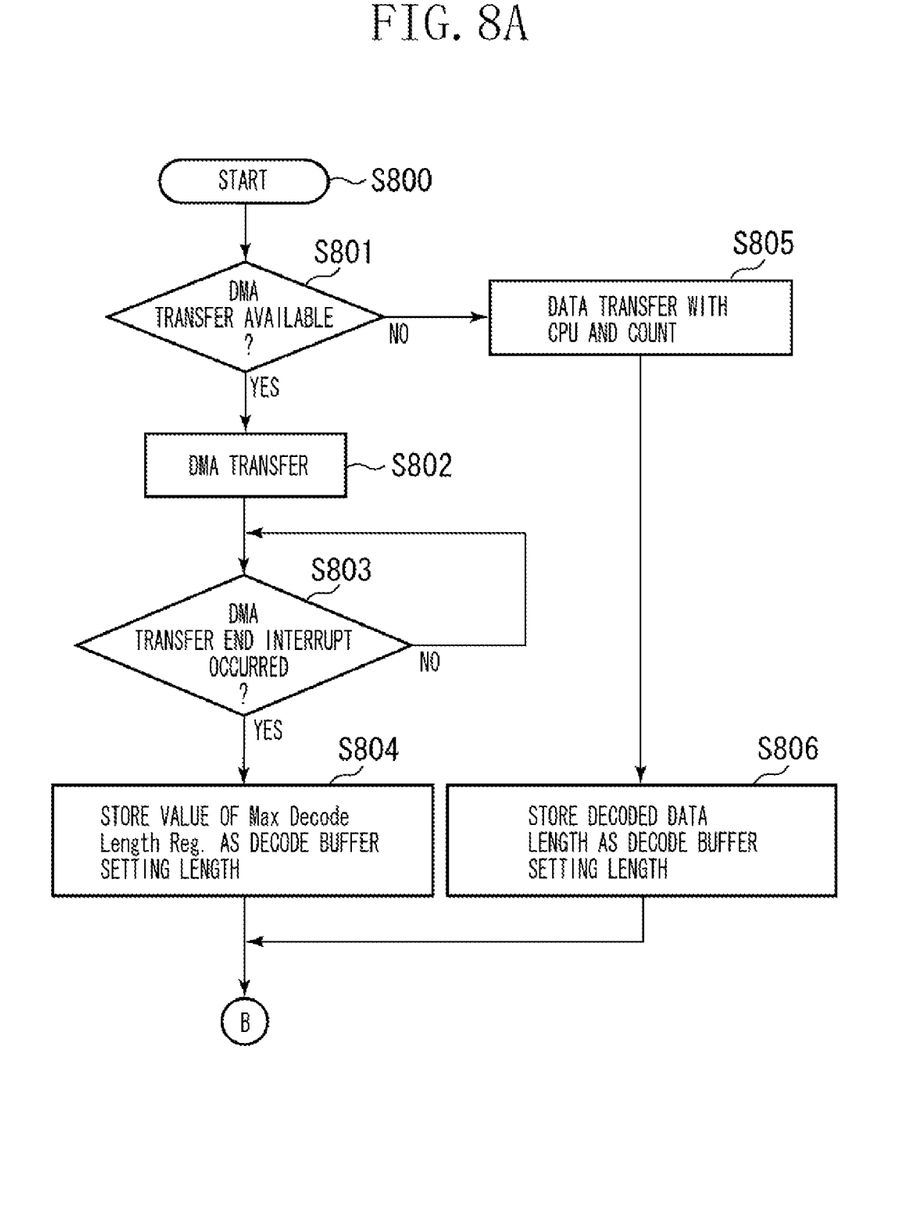
FIG. 8A is a flow chart illustrating an example of data transfer processing (without reprocessing) of a band according to an exemplary embodiment of the present invention.
Figure 8B:
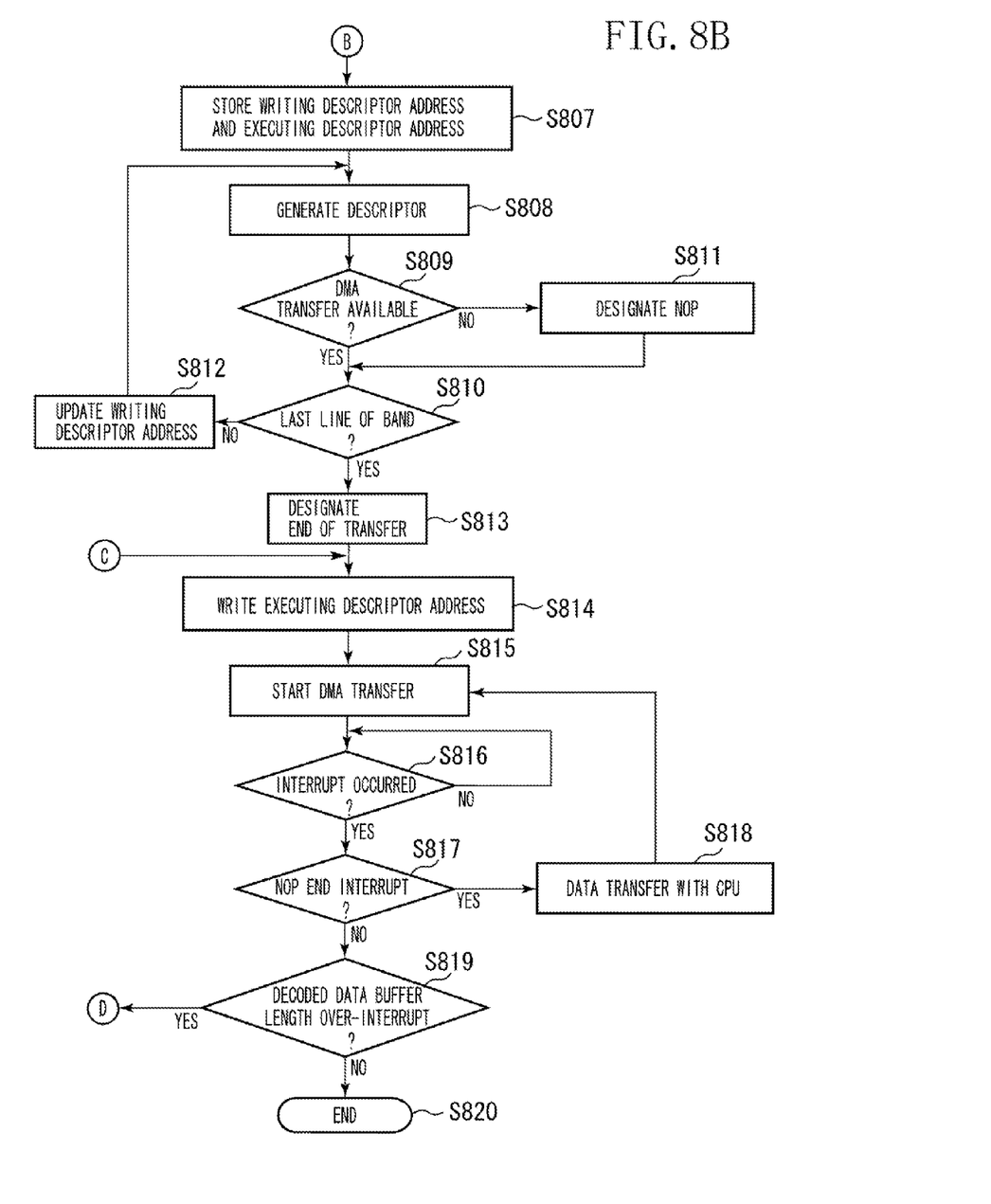
FIG. 8B is a flow chart illustrating an example of data transfer processing (without reprocessing) of a band according to another exemplary embodiment of the present invention.
Figure 8C:
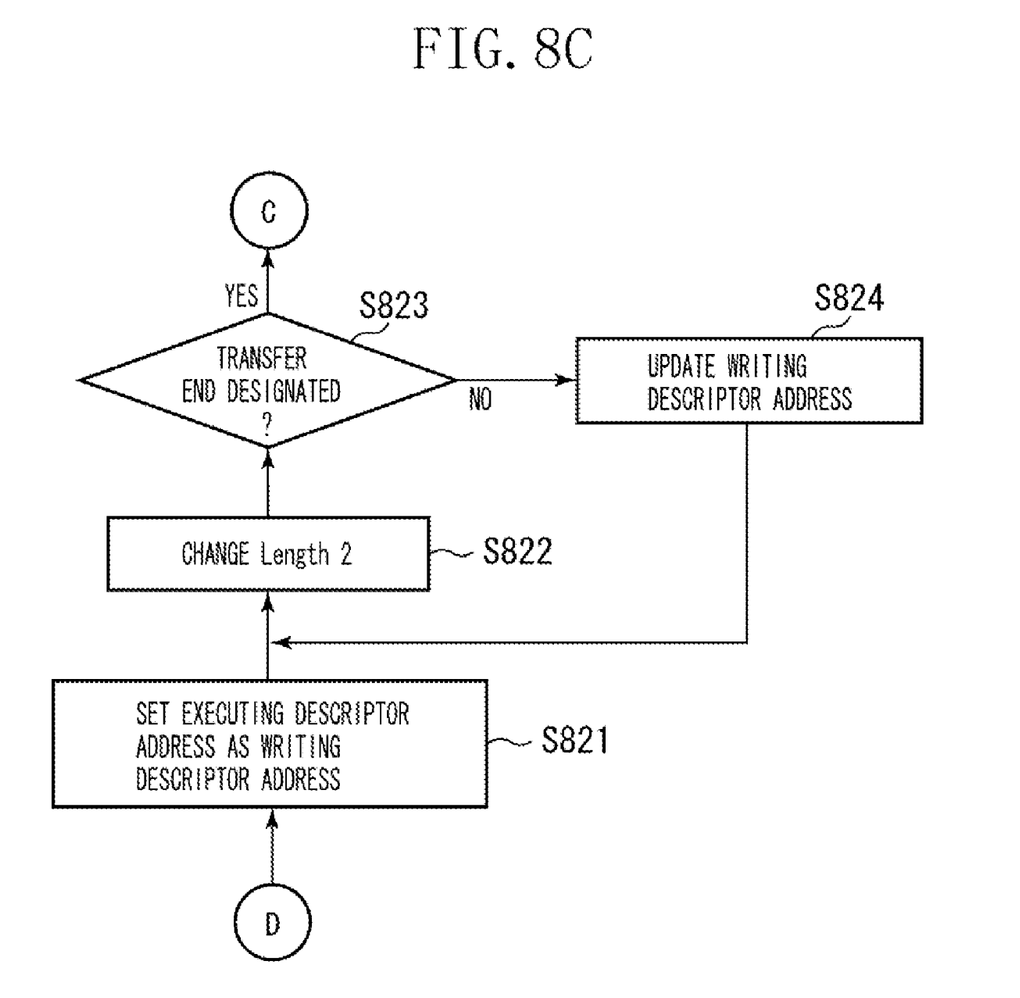
FIG. 8C is a flow chart illustrating an example of data transfer processing (without reprocessing) of a band according to another exemplary embodiment of the present invention.

In the present exemplary embodiment, the DMAC 200 transfers data from the receiving buffer 502 to the internal buffer 503 according to the sequence illustrated in FIGS. 8A through 8C. Each of the flow charts of FIGS. 8A through 8C is continued at the step illustrated with the same alphabetical character.

In the present exemplary embodiment, an appropriate number of descriptors enough to set one band are provided as described above. Furthermore, a Next Descriptor Address of each descriptor is previously set with a value so that the descriptors can be referred to from the first descriptor. The Interrupt Mask Reg. 302 masks neither the DMA transfer end interrupt, NOP end interrupt, nor decoded data buffer length over-interrupt.

Referring to FIG. 8A, in step S800, the CPU 100 starts the processing for one band.

In step S801, the CPU 100 determines whether the first line can be DMA-transferred. Here, the CPU 100 interprets the print control command to recognize the data length and the decoding method for the line. Here, the CPU 100 determines that the DMA transfer cannot be performed if the data length is equal to or shorter than 4 bytes in the case of the PackBits encoding. Furthermore, the CPU 100 determines that the DMA transfer cannot be performed if the data length is 2, 3, or 4 bytes in the case of the Seed Row encoding.

If it is determined in step S801 that the first line can be DMA-transferred (YES in step S801), then the processing advances to step S802. In step S802, the CPU 100 performs the necessary setting for decoding the first line on the REG 201 and performs the DMA transfer with the decoder 104 in the single transfer mode. Here, the CPU 100 sets the number of bytes equivalent to the maximum printable length (sheet width) in the Interrupt Status Reg. 301.

In step S803, the CPU 100 waits until a DMA transfer end interrupt occurs. If the DMA transfer end interrupt is detected in step S803, then the processing advances to step S804. In step S804, the CPU 100 reads the value of the Max Decode Length Reg. 303 and stores the read value as the decoding buffer setting length, and processing advances to step S807 in FIG. 8B.

On the other hand, if it is determined in step S801 that the first line cannot be DMA-transferred (NO in step S801), then the processing advances to step S805. In step S805, the CPU 100 decodes the data and counts the decoded data length.

In step S806, the CPU 100 stores the counted decoded data length as the decoded buffer setting length, and processing advances to step S807 in FIG. 8B.

In step S807, shown in FIG. 8B, the CPU 100 stores the address of the first descriptor as the writing descriptor address and the executing descriptor address.

In step S808, a descriptor is generated. More particularly, the CPU 100 starts the processing for one line from the first line. Here, the CPU 100 interprets the print control command to recognize the data length and the decoding method for the line. Furthermore, the CPU 100 sets the setting for transferring the decoded data to the internal buffer 503 to the descriptor existing at the writing descriptor address.

In step S809, the CPU 100 determines whether the DMA transfer can be performed. Here, the CPU 100 determines that the DMA transfer cannot be performed if the data length is equal to or shorter than 4 bytes in the case of the PackBits encoding. Furthermore, the CPU 100 determines that the DMA transfer cannot be performed if the data length is 2, 3, or 4 bytes in the case of the Seed Row encoding.

If it is determined in step S809 that the DMA transfer cannot be performed (NO in step S809), then the processing advances to step S811. In step S811, the CPU 100 sets the value "1" to the bit 30 of the Descriptor Control 408 to designate NOP. On the other hand, if it is determined in step S809 that the DMA transfer can be performed (YES in step S809), the CPU 100 sets the value "0" to the bit 30 of the Descriptor Control 408 and does not designate NOP. Then, the processing advances to step S810.

In step S810, the CPU 100 determines whether the currently processed line is the last line of the current band. If it is determined in step S810 that the currently processed line is the last line of the current band (YES in step S810), then the processing advances to step S813. In step S813, the CPU 100 sets the value "1" to the bit 31 of the Descriptor Control 408 and designates ending the link array chain transfer, and processing advances to step S814.

On the other hand, if it is determined in step S810 that the currently processed line is not the last line of the current band (NO in step S810), then the processing advances to step S812. In step S812, the CPU 100 stores the value of the Next Descriptor Address 400 in the writing descriptor address, and sets the value "0" to the bit 31 of the Descriptor Control 408. Then, the processing returns to step S808.

In step S814, the CPU 100 writes the executing descriptor address into the Next Descriptor Address Reg. 304.

In step S815, the CPU 100 instructs starting the link array chain transfer with the Start Reg. 300.

In step S816, the CPU 100 waits until an interrupt by the decoder 104 occurs. When an interrupt by the decoder 104 occurs (YES in step S816), then in step S817, the CPU 100 reads the value of the Interrupt Status Reg. 301 and determines the factor of the interrupt.

If the interrupt factor is the NOP end interrupt (YES in step S817), then the processing advances to step S818. In step S818, the CPU 100 reads the value in each register of the REG 201, (thereby obtaining the setting in REG 201), decodes the data with the processing by the CPU 100 according to the setting, and then stores the decoded data in the internal buffer 503. Then, the CPU 100 clears the value of the Interrupt Status Reg. 301 and returns to step S815.

Here, the REG 201 includes the value set at the time the NOP end interrupt has occurred. Thus, the DMAC 200 resumes the DMA transfer from the next line by reading a descriptor based on the address in the Next Descriptor Address Reg. 304.

On the other hand, if it is determined in step S817 that the interrupt factor is not the NOP end interrupt (NO in step S817), then the processing advances to step S819. In step S819, the CPU 100 determines which of the decoded data buffer length over-interrupt or the DMA transfer end interrupt is the interrupt factor. If it is determined in step S819 that the interrupt factor is the DMA transfer end interrupt (NO in step S819), then the CPU 100 clears the value for the Interrupt Status Reg. 301. Then, the processing advances to step S820 to end the processing.

If it is determined in step S819 that the interrupt factor is the decoded data buffer length over-interrupt (YES in step S819), then the CPU 100 clears the value for the Interrupt Status Reg. 301. Then, the processing advances to step S821 illustrated in FIG. 8C.

In step S821 in FIG. 8C, the CPU 100 sets the executing descriptor address to the writing descriptor address.

In step S822, the CPU 100 sets the number of bytes equivalent to the printable width (sheet width) to the Length 2 406 of the descriptor existing at the writing descriptor address.

In step S823, the CPU 100 reads the Descriptor Control 408 of the descriptor and determines whether a designation for the link array chain transfer end has been performed. If it is determined in step S823 that a designation for the link array chain transfer end has been performed (YES in step S823), then the processing returns to step S814 in FIG. 8B. On the other hand, if it is determined in step S823 that a designation for the link array chain transfer end has not been performed (NO in step S823), then the processing advances to step S824. In step S824, the CPU 100 stores the value of the Next Descriptor Address 400 as the writing descriptor address, and then the processing returns to step S822.

According to the above-described sequence, the CPU 100 generates a descriptor for one band by setting a necessary minimum decoded data buffer length and performs the decoding and transfer processing. Here, the necessary minimum decoded data buffer length can be predicted by decompressing the first line once. If, as a result of decoding the first line, and if the coded and compressed data that can be decoded in the length longer than the predetermined decoded data buffer length exists, the CPU 100 performs the decoding processing again after changing the decoded data buffer length to the number of bytes equivalent to the maximum printable width (sheet length).

According to the present exemplary embodiment, with the above-described processing, if the lengths of the original data for the lines match one another within one band, the number of accesses to the RAM 101 can be reduced, and thus the processing efficiency of the printer can be improved. The present exemplary embodiment is particularly useful in a large-format printer that can perform printing with a large size sheet. Furthermore, according to the present exemplary embodiment, the transfer setting value is managed as the descriptor, including the values processed with the CPU. Accordingly, in the case where reprocessing of the data is necessary, the present exemplary embodiment can efficiently perform the setting for the reprocessing.

The DMA transfer apparatus according to the present exemplary embodiment, when the DMA transfer apparatus has received a transfer setting value including an NOP designation designating that the DMA transfer is not to be performed and when the NOP designation has been performed, can end the transfer processing without performing the DMA transfer by generating an NOP interrupt signal. Accordingly, if it has been detected that the amount of the data transfer exceeds the restriction of the minimum value for the DMA transfer length, the present exemplary embodiment can previously designate the transfer setting value including the NOP designation and can also perform the transfer processing with the CPU based on the NOP interrupt signal.

Moreover, the DMA transfer apparatus according to the present exemplary embodiment can include a decoding function for decoding the coded and compressed data and transferring to the transfer destination in the case of the DMA transfer. Furthermore, in the case of the DMA transfer that requires the decoding of image data, for example, and if the restriction of the minimum value for the DMA transfer length cannot be satisfied and thus the decoding function cannot be used, the DMA transfer apparatus of the present exemplary embodiment can utilize the above-described NOP designation.

Furthermore, according to the data transfer control method for transferring the data with the CPU using the DMA transfer apparatus according to the present exemplary embodiment and the data transfer control program therefor, if, for example, it is detected that the amount of the data transfer exceeds the restriction of the minimum value for the DMA transfer length, the NOP designation can be used. Moreover, in this case, the present exemplary embodiment can perform the data transfer with the CPU similar to the data transfer to be performed with the DMA transfer apparatus using the register value in the DMA transfer apparatus. Accordingly, the present exemplary embodiment can smoothly perform the data transfer with the DMA transfer apparatus and the data transfer with the CPU with a high processing efficiency according to the processing status in cooperation with one another.

That is, according to the present exemplary embodiment, NOP can be designated using the transfer setting value (descriptor) to the DMA transfer apparatus. Thus, the present exemplary embodiment can previously provide the transfer setting values at once even when the DMA transfer apparatus cannot perform the DMA transfer. Accordingly, the present exemplary embodiment can describe the control program for the CPU for controlling the entire data transfer operation. Furthermore, the present invention can reduce the load taken for reprocessing, by using shared descriptors (setting values for data transfer stored in a memory) in software processing (data transfer with the CPU) and hardware processing (DMA transfer). Moreover, the present invention is directed to a method that enables, in the case of decoding using a DMA transfer apparatus, an efficiently decoding processing operation by the DMA transfer apparatus and a decoding processing operation by a CPU in an appropriate collaboration with each other using a previously generated descriptor with a control program.

The present invention can be implemented not only by a DMA transfer apparatus that decodes image data that has been coded and compressed in a printing apparatus but also by various types of data processing apparatuses that perform data transfer, such as a computer, a scanner, a communication apparatus, and a digital television set. Moreover, the data that can be processed according to the present exemplary embodiment is not limited to image data. That is, if the processing content of the decoder (the DEC 204 in FIG. 2) is changed, the present invention can perform decoding processing on data encrypted for a specific purpose. The control program for the CPU for implementing the present invention can be previously stored in a ROM (the ROM 102) or can be loaded from another storage medium (a magneto-optical disk (MO), a compact disk-read only memory (CD-ROM), a DVD-read only memory (DVD-ROM), or various types of memory cards), or can be installed or updated on a target system via a network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-330075 filed Dec. 7, 2006, which is hereby incorporated by reference herein in its entirety.

What is claimed is:

1. A data transfer control system comprising:
a direct memory access (DMA) transfer apparatus sequentially reading, into a register, at least one transfer setting value for data transfer stored in a memory and to perform DMA transfer processing based on the read transfer setting value, the DMA transfer apparatus comprising:
a unit receiving a No Operation (NOP) designation for designating no performance of DMA transfer as the transfer setting value;
a unit generating, when the NOP designation has been performed with the transfer setting value read into the register, an NOP interrupt signal to end the DMA transfer processing without performing the DMA transfer;
a unit decoding coded and compressed data and to transfer the decoded data to a transfer destination during the DMA transfer; and
a central processing unit (CPU),
wherein the CPU determines a transfer length of data to be transferred based on a threshold value, and sets the NOP designation to a predetermined address of the transfer setting value when the transfer length of data to be transferred is equal to or shorter than the threshold value;
wherein the data transfer control system performs data decode and data transfer with the CPU using the DMA transfer apparatus;
wherein the CPU is programmed to provide:
a CPU data transfer unit performing transfer equivalent to a transfer function of the DMA transfer apparatus with processing by the CPU;
an interrupt detection unit detecting the NOP interrupt signal from the DMA transfer apparatus; and
a unit performing, when the NOP interrupt signal has been detected by the interrupt detection unit, data decode and data transfer with processing by the CPU based on the transfer setting value read into the register in the DMA transfer apparatus and, after that, restart the DMA transfer to the DMA transfer apparatus.

2. The data transfer control system according to claim 1, wherein the CPU omits setting the NOP designation to the predetermined address of the transfer setting value when the transfer length of data transfer to be performed is longer than the threshold value.

3. The data transfer control system according to claim 1, further comprising setting the NOP designation to the predetermined address of the transfer setting value when the transfer length of data transfer to be performed is longer than the threshold value.

* * * * *